United States Patent
Melville et al.

(10) Patent No.: US 10,509,395 B2
(45) Date of Patent: Dec. 17, 2019

(54) MODEL NUMERICAL SOLVER FOR SYSTEM CONTROL

(71) Applicant: Sendyne Corporation, New York, NY (US)

(72) Inventors: Robert C Melville, New York, NY (US); Nicolas Clauvelin, New York, NY (US); Ioannis Milios, New York, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 15/500,885

(22) PCT Filed: Oct. 18, 2016

(86) PCT No.: PCT/US2016/057507
§ 371 (c)(1),
(2) Date: Jan. 31, 2017

(87) PCT Pub. No.: WO2017/180183
PCT Pub. Date: Oct. 19, 2017

(65) Prior Publication Data
US 2018/0067479 A1 Mar. 8, 2018

Related U.S. Application Data (63) Continuation of application No. 15/110,408, filed as application No. PCT/US2016/027148 on Apr. 12, 2016, now abandoned.
(Continued)

(51) Int. Cl.
*G06F 17/50* (2006.01)
*G05B 19/4155* (2006.01)
(Continued)

(52) U.S. Cl.
CPC ......... *G05B 19/4155* (2013.01); *G06F 17/13* (2013.01); *G06F 17/50* (2013.01);
(Continued)

(58) Field of Classification Search
CPC ....... B60L 11/1861; G06N 5/02; G06F 9/455; G06F 17/5009; G06F 7/38; G06B 19/41885; G06Q 10/04
See application file for complete search history.

(56) References Cited

U.S. PATENT DOCUMENTS

| | | | |
|---|---|---|---|
| 6,016,047 | A | 1/2000 | Notten et al. |
| 7,574,342 | B2 | 8/2009 | Kundert |

(Continued)

FOREIGN PATENT DOCUMENTS

WO  2016168202 A1  10/2016

OTHER PUBLICATIONS

Office Action for U.S. Appl. No. 15/110,408, dated Nov. 28, 2017.
(Continued)

*Primary Examiner* — Kandasamy Thangavelu
(74) *Attorney, Agent, or Firm* — Oppedahl Patent Law Firm LLC (57) ABSTRACT

A complete model numerical solver resides on an embedded processor for real time control of a system. The solver eliminates the need for custom embedded code, requiring only model equations, definition of the independent and dependent variables, parameters and input sources information as input to solve the model equations directly. Through elimination of the need for custom code, the solver speeds up the model deployment process and provides the control application sophisticated features such as Automatic Differentiation, sensitivity analysis, sparse linear algebra techniques and adaptive step size in solving the model concurrently.

12 Claims, 8 Drawing Sheets

Related U.S. Application Data (60) Provisional application No. 62/147,312, filed on Apr. 14, 2015.

(51) Int. Cl.
  *G06F 17/13* (2006.01)
  *G06N 5/00* (2006.01)
  G06F 8/41 (2018.01)
  G06G 7/64 (2006.01)

(52) U.S. Cl.
  CPC ........ *G06F 17/504* (2013.01); *G06F 17/5036* (2013.01); *G06N 5/003* (2013.01); *G05B 2219/39077* (2013.01); *G06F 8/41* (2013.01); *G06F 2217/78* (2013.01); *G06G 7/64* (2013.01)

(56) References Cited

U.S. PATENT DOCUMENTS

| | | | |
|---|---|---|---|
| 7,805,284 B2 | 9/2010 | Konno et al. | |
| 7,904,280 B2* | 3/2011 | Wood | G06F 17/5009 700/2 |
| 8,332,199 B1 | 12/2012 | Zhang | |
| 8,620,705 B2* | 12/2013 | Peterson | G06Q 10/04 700/28 |
| 9,697,020 B2* | 7/2017 | Maclay | G06F 9/455 |
| 2004/0148324 A1 | 7/2004 | Garg | |
| 2006/0080482 A1 | 4/2006 | Dixon | |
| 2010/0262973 A1* | 10/2010 | Ernst | G06F 9/5011 718/104 |
| 2011/0131559 A1* | 6/2011 | Young | G06F 8/314 717/145 |
| 2012/0023149 A1* | 1/2012 | Kinsman | G06F 7/38 708/204 |
| 2012/0059782 A1 | 3/2012 | Pekar | |
| 2012/0324198 A1* | 12/2012 | Spradlin | G06F 12/0223 711/170 |
| 2013/0090907 A1 | 4/2013 | Maliassov | |
| 2013/0212054 A1* | 8/2013 | Shankar | G06N 5/02 706/45 |
| 2014/0007044 A1* | 1/2014 | Aliseychik | G06F 8/30 717/106 |
| 2014/0019668 A1* | 1/2014 | Das | G06F 11/14 711/101 |
| 2014/0033162 A1 | 1/2014 | Iyer et al. | |
| 2015/0113229 A1* | 4/2015 | Boettiger | G06F 9/528 711/145 |
| 2015/0161385 A1 | 6/2015 | Gounares et al. | |
| 2016/0023567 A1* | 1/2016 | Lee | B60L 11/1861 320/136 |
| 2016/0098038 A1* | 4/2016 | Maturana | G05B 19/41885 703/20 |
| 2016/0147920 A1* | 5/2016 | Goulkhah | G06F 17/5009 703/21 |

OTHER PUBLICATIONS

Gaffar et al., "Floating-point Bitwidth Analysis via Automatic Differentiation," IEEE, 2002.
U.S. Appl. No. 15/110,408, filed Jul. 8, 2016.
International Search Report for application PCT/US2016/057507, dated Jan. 31, 2017.
Written Opinion of the International Searching Authority for application PCT/US2016/057507, dated Jan. 31, 2017.
International Search Report for application PCT/US2016/027148, dated Jul. 7, 2016.
Written Opinion of the International Searching Authority for application PCT/US2016/027148, dated Jul. 7, 2016.

* cited by examiner

MODEL NUMERICAL SOLVER FOR SYSTEM CONTROL

CROSS REFERENCE APPLICATIONS

This application claims the benefit of provisional application No. 62/147,312 filed Apr. 14, 2015 and incorporated herein by reference for all purposes.

TECHNICAL FIELD

The present invention relates to adaptive control of an embedded system. More specifically, the invention relates to a model numerical solver program for use with a model description in an embedded processor of a control system.

BACKGROUND

In various control applications and for the present invention, a mathematical model refers to a set of mathematical equations relating dependent variables and independent variables. That is, those equations define explicitly or implicitly a set of dependent variables as functions, in the mathematical sense, of independent variables. The equations of a model can either be differential (the derivative of at least one dependent variable with respect to an independent variable appears in the equation) or algebraic (no derivative appears in the equation), and for the present invention at least one of the model equations is differential. The number of model equations is always equal to the number of dependent variables. Those equations can involve numerical quantities referred to as parameters which do not depend on any of the model variables, and whose values lie between fixed upper and lower bounds. In addition, the model equations include functions of the independent variables referred to as input sources, whose values can be arbitrarily controlled and defined. A model description therefore consists of a list of differential and algebraic equations together with a list of dependent and independent variables, the values and bounds of the parameters, and the definition of the input sources in terms of the independent variables. The purpose of a model numerical solver software is to perform the computational tasks required to obtain the values of the dependent variables as numerical functions of the independent variables, parameters and input sources. This task is achieved by computing numerical approximations of the model equations using finite differences techniques of arbitrary order, which are implemented in the solver numerical routines. Those approximations are used iteratively to numerically solve the model equations, and the sequence of those iterative approximations is referred to as the solving steps. It is important to note that, the numerical routines used to numerically solve the model equations are independent from the precise form of the model equations.

Control methods referred to as Model Reference Adaptive Control require the capability of updating the model parameters to achieve a pre-defined goal while operating the controlled system, such as minimizing the error between the model prediction and the actual response of the controlled system. This can be achieved by the model numerical solver through the use of a numerical optimizer which computes the optimal values of the model parameters with respect to a pre-defined goal. The numerical optimizer should guarantee that the computed optimal values of the parameters lie within the lower and upper bounds defined in the model description.

Mathematical models are used in various control applications ranging from mechatronics to industrial systems controls. These models are typically described by a set of non-linear Differential Algebraic Equations (DAE) for which an analytical solution either is not known or does not exist. Modern numerical techniques are extremely efficient for obtaining numerical solutions of such equations. For systems described by a set of Partial Differential Equations (PDE) spatial discretization schemes are employed to transform them into a set of DAEs.

Real time control methods require such models to be ported into an embedded processor and solved in "real time" relative to the time constants of the controlled process. Some advanced control methods such as Model Reference Adaptive Control (MRAC) also involve updating the parameters of the model in real time in order to minimize error or adapt to changes in the controlled system.

So far the process of model development/optimization and its embedded implementation has been a two-step process. First the model is developed and optimized in a general purpose Computer Aided Engineering (CAE) environment. After the model has been verified and optimized custom model code is generated either automatically or manually.

The two-step process has the following drawbacks:
1. The code produced does not contain all the functionality available in the CAE environment. For example the Embedded Coder of MATLAB™ does not provide essential numerical routines such as the DAE solver itself. The resulting software is compromised as it cannot benefit from features such as an efficient DAE solver or runtime sensitivity analysis which may be required in certain adaptive control applications. Other features that affect computational performance such as adaptive step-size are also not included.
2. Any change in the model itself requires repetition of the two-step process. If the code is produced manually it adds significantly to the cost of the system.

Accordingly, a solution which minimizes or eliminates these current drawbacks for model development and its embedded implementation would be beneficial.

SUMMARY OF THE INVENTION

The present invention discloses a complete model numerical solver that is small enough to reside on an embedded processor. It contains all the features of a State-of-the-Art solver including Automatic Differentiation (AD), complete DAE solver like IDAS or DASSL, sparse linear algebra techniques, sensitivity analysis, numerical optimization routines and adaptive step size. It accomplishes all these functions in a few hundred kilobytes of code space (depending on enabled features) without requiring creation of custom embedded code. All an operator needs to input is the model description (as explained above), as one would input them in a general purpose CAE package.

It should be appreciated that for porting a model numerical solver into an embedded processor the designer has to work within the constraints of a finite memory size.

The complex computational steps associated with solving a set of algebraic differential equations describing a model require memory allocations (for example, allocating memory to an array in order to perform a linear algebra operation). Those memory allocations are traditionally dynamic allocations, i.e. memory is allocated "on the fly" during run time without knowledge of the exact amount of space needed at compile time. Dynamic allocation is by nature non-deterministic. The time required to "find" the requested memory space will depend both on the size of memory requested as well as the memory used by other processes executed on the embedded processor. Any task associated with dynamic memory allocation can thus take an arbitrarily long time or even fail. This is not the case with "static memory allocation" where the exact memory size requirement must be known at compile time.

Prior art model solvers, designed for environments with much higher computing and memory resources than those of an embedded processor, use dynamic memory allocation. For example, the SUNDIALS (Suite of Nonlinear and Differential/Algebraic equation solvers) software package developed by Lawrence Livermore National Laboratory is considered to represent the state of the art for numerical solvers for ordinary and algebraic differential equations. In the code examples shipped with the SUNDIALS software package (e.g., cvsDiurnal_FSA_kry.c) it is shown that dynamic memory allocations are performed at each solving step.

It is obvious that for a task that must be executed in real time, the memory requirements of prior art and resulting unpredictable execution times are unacceptable in a safety critical application such as motor control, which requires continuous monitoring and control in real time.

The present invention model numerical solver implements a specific memory layout and memory allocation strategy to address those issues.

Figure 6:
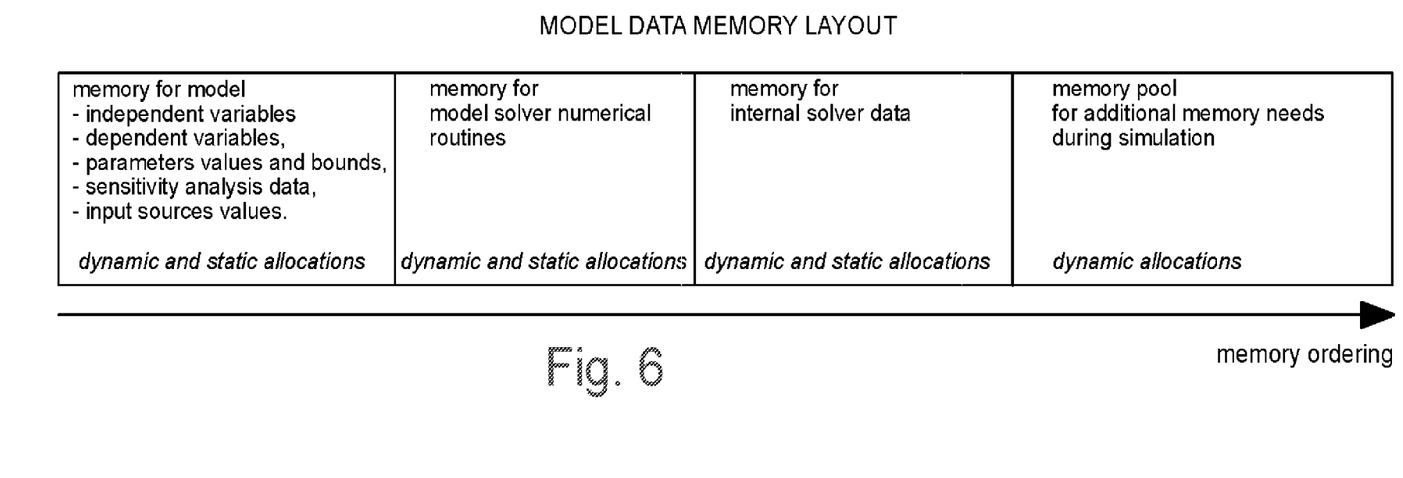
FIG. 6 is an exemplary memory allocation of the present invention.

Once a model is defined, the numerical solver of the present invention automatically estimates an upper bound on the total memory requirements of the various components of the solver (i.e., model variables, solver data structures and solver internal memory requirements, additional memory pools; see FIG. 6). The present invention solver then proceeds with the allocation of all the required memory during the instantiation and initialization phase. In particular, this allocation of the model data includes allocating memory pools, i.e. memory segments that can be shared among the solver tasks. Those memory pools are used to perform memory allocation during the solving steps, the advantage being that those allocations are equivalent to static allocations since the memory has already been allocated for the pool and its size cannot be exceeded by any solver process. This implies that the model numerical solver of the present invention guarantees that after the instantiation and initialization phase no dynamic memory allocation will be performed. This is a difference compared to the prior art.

These methods make possible performance of the computational tasks associated with solving differential equations within the microprocessor of an embedded device and are thus able to guarantee a deterministic response time.

The present invention eliminates the need for custom model code by solving the model equations directly; speeds up the model deployment effort; is more reliable and cost effective as it eliminates one step in the model deployment process; makes available to the control application sophisticated solver features such as Automatic Differentiation, sensitivity analysis, sparse linear algebra techniques, numerical optimization routines, and adaptive step size. The model numerical solver of the present invention is suitable for stiff problems such as the motor control problem.

According to the present invention, the model solver program is written in C/C++ and provides a clean, stable and well-documented API (Application Programming Interface) making possible convenient interfacing with external software and use of the model numerical solver's features in a wide range of applications.

The description of the model can be input into the program using one of the following methods:

A Functional Mock-up Interface (FMI) description of the model (FMI is a standardized interface for the description of complex physical systems).

A C++ source file that will be evaluated at compile time containing at least the definition of a numerical routine to evaluate the dependent variables of the model as numerical functions for the independent variables, parameters and input sources.

A XML/MathML file describing the model as a list of independent and dependent variables, parameters values and bounds, input sources and differential and algebraic equations, which makes it possible to use available parsers to convert the description of the model in other formats (for example, LaTeX or HTML).

BRIEF DESCRIPTION OF THE DRAWINGS

The invention will be described with respect to a drawing in several figures, of which.

DETAILED DESCRIPTION OF THE DRAWINGS

Figure 1:
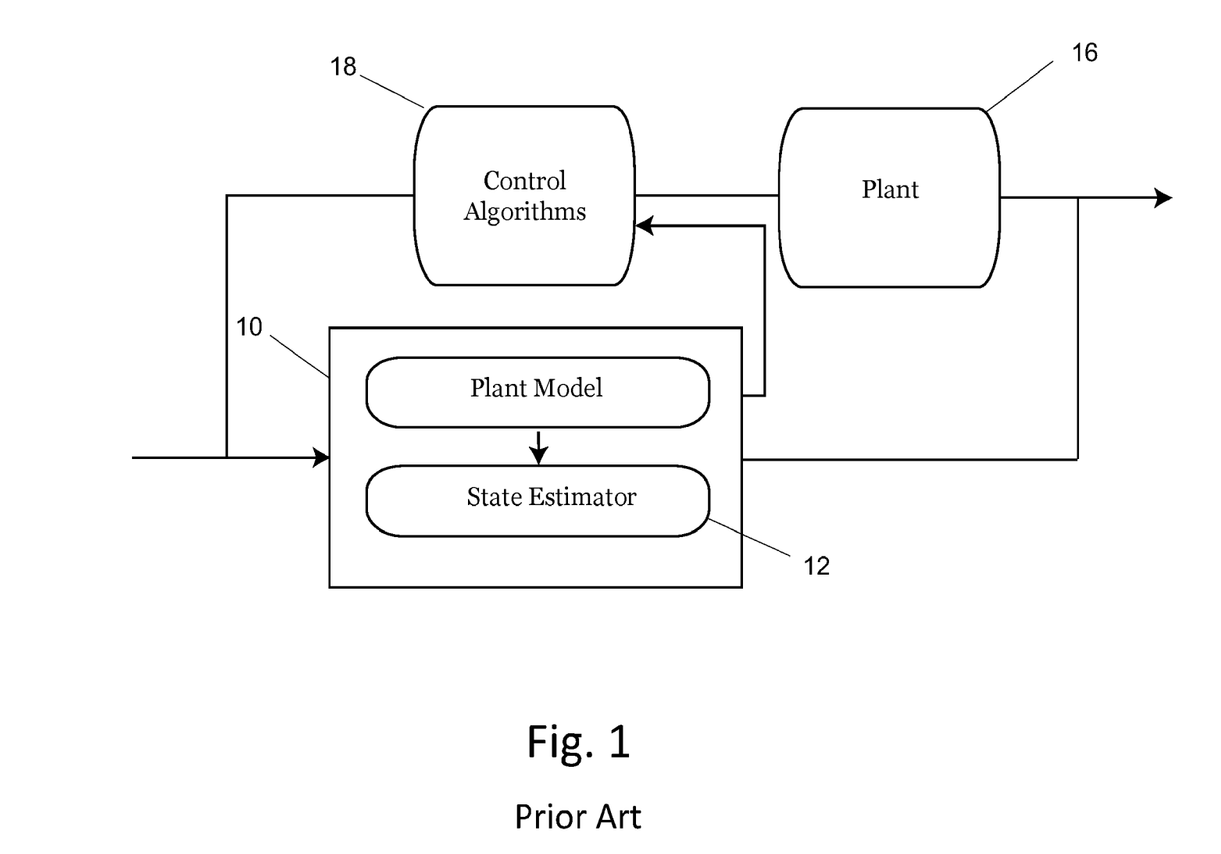
FIG. 1 is a prior art illustration of model based adaptive control as implemented in a Motor Control System.

A model based adaptive control system as implemented in a Motor Control System is shown in FIG. 1. The plant model 10 and state estimator 12 receive information as input sources from the plant 16 indicating a present state of the plant. The plant model 10 and state estimator 12 use this information to calculate an estimation of a future state of the plant. This estimation is communicated to control algorithms 18 which control operation of the plant 16 according to their own performance standards.

Figure 2:
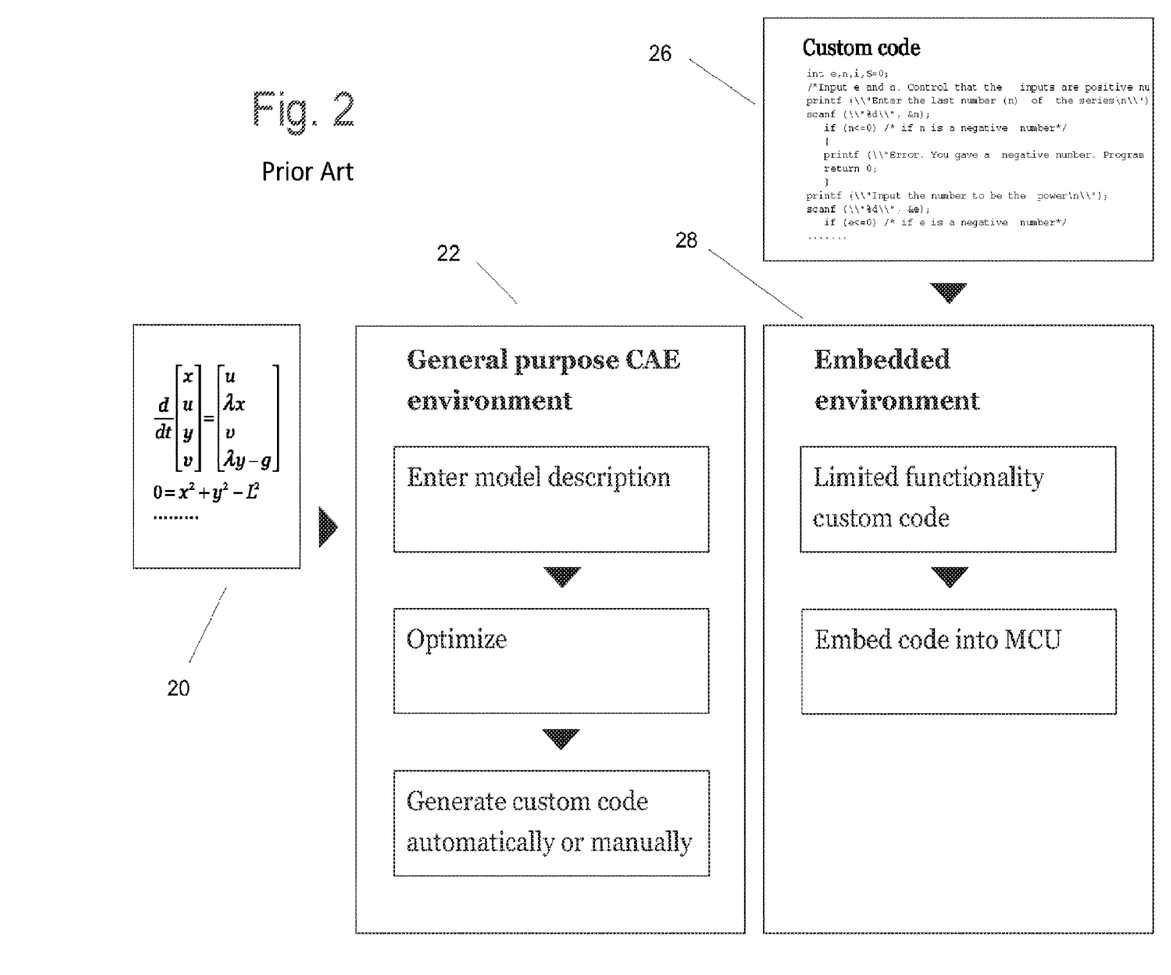
FIG. 2 is a prior art illustration of a typical two-step process for model development and deployment in an embedded environment.

A typical two-step process for model development and deployment in an embedded environment is shown in FIG. 2. A developer enters the model description 20 into a general purpose CAE environment 22 which optimizes and generates custom code either automatically or manually. After this initial step, the generated code 26 is then provided to the embedded environment 28 of the specific system.

Figure 3:
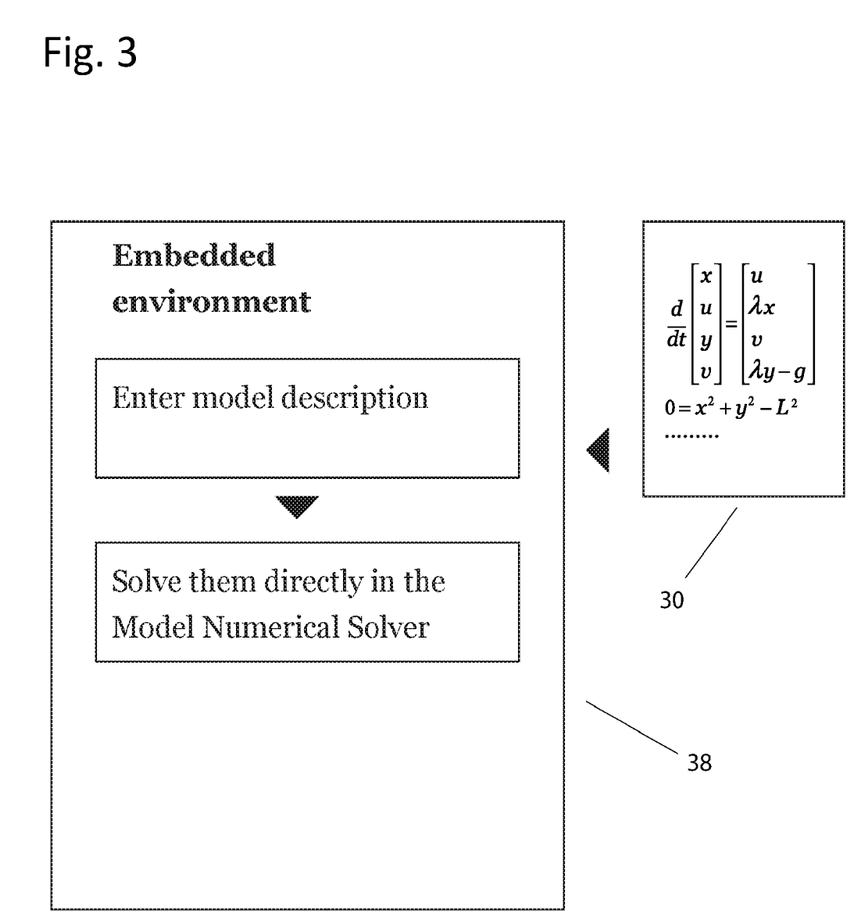
FIG. 3 is an illustration of model equations solved directly in an embedded processor according to the present invention.

FIG. 3 is an illustration of the model numerical solver operation according to the invention. Model description 30 is entered directly into the embedded environment 38. The embedded environment 38 contains the model numerical solver, which solves the model equations 30 directly and concurrently.

Figure 4:
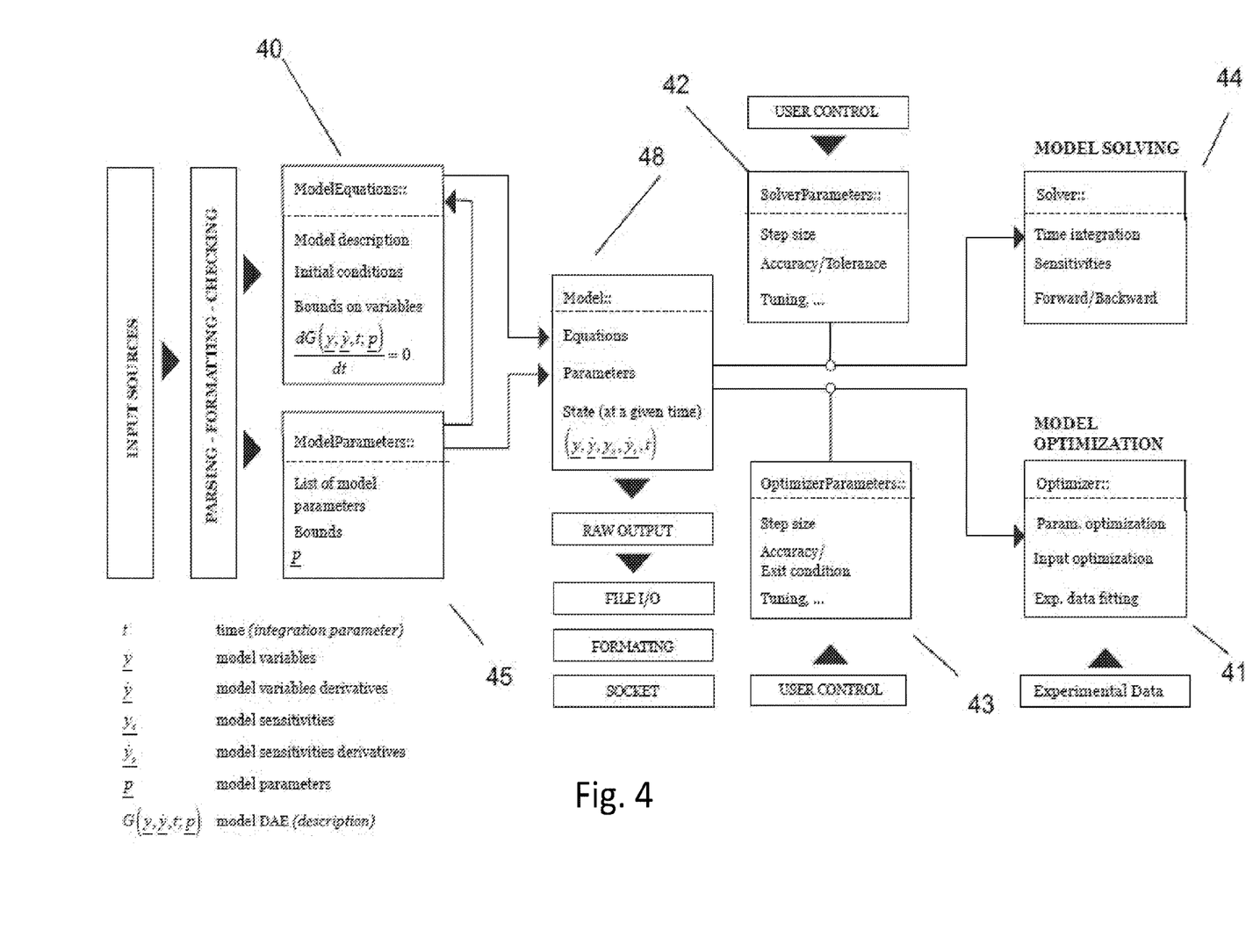
FIG. 4 is an illustration of the model numerical solver structure as implemented in the invention.

The structure and operation of the model numerical solver is illustrated in FIG. 4. Model equations 40 and model parameters 45 are defined and provided to a model 48. Refinement of the model is possible through user-controlled solver parameters 42 and optimizer parameters 43. Model solving is performed in the solver 44 and model optimization is performed in the model optimizer 41.

Figure 5:
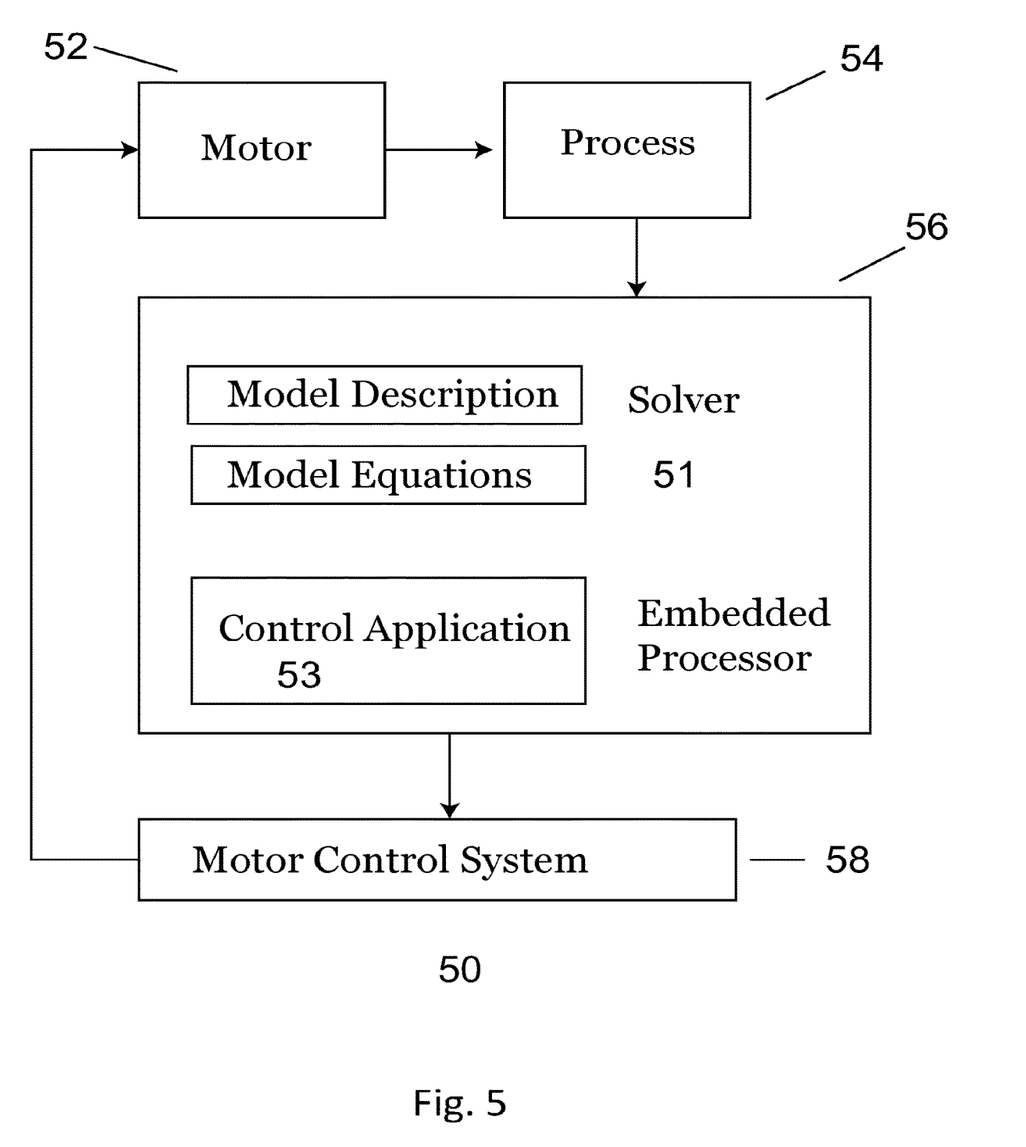
FIG. 5 is an example of an arrangement of the present invention in a motor control system.

FIG. 5 is an example of an arrangement of the invention in a motor control system. A motor control system 50 includes a motor 52 controlling a process 54. The motor 52 and the process 54 provide information values to an embedded processor 56 related to the present state of the motor and the process requirements. The model numerical solver 51 of the present invention resides within a memory of the embedded processor 56 and, after solving the model equations for the provided values, estimates the motor inputs necessary to bring the process into a desired state and communicates these inputs to a control application 53. The control application 53 determines the operation of a motor control system 58, which generates the appropriate electrical inputs to the motor 52.

An exemplary memory allocation of the present invention is shown in FIG. 6.

Figure 7:
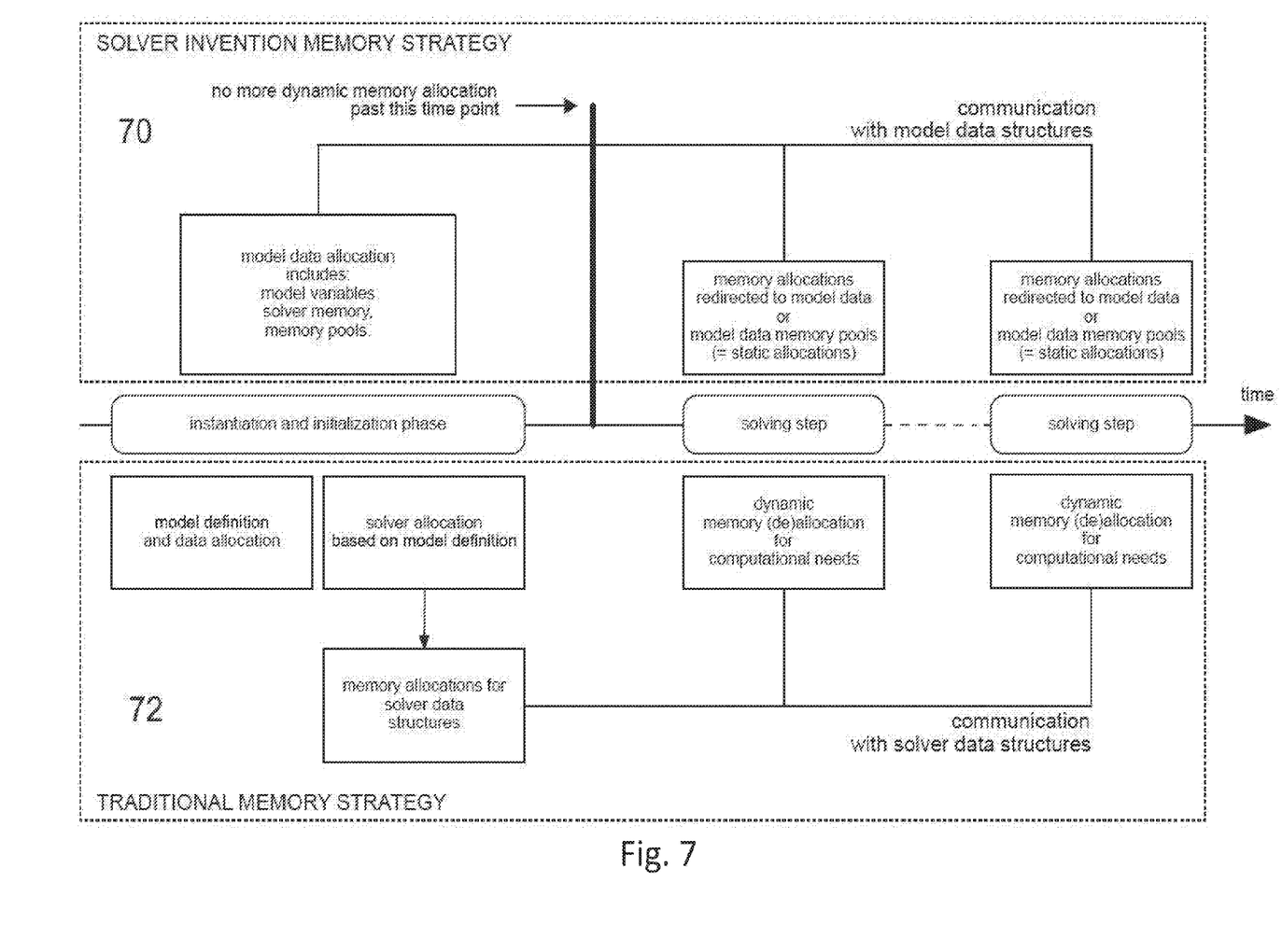
FIG. 7 is a comparison between the memory strategy of the model solver in the present invention and a traditional memory strategy.

FIG. 7 provides a comparison between the memory strategy 70 of the model solver in the present invention and a traditional memory strategy 72.

Figure 8:
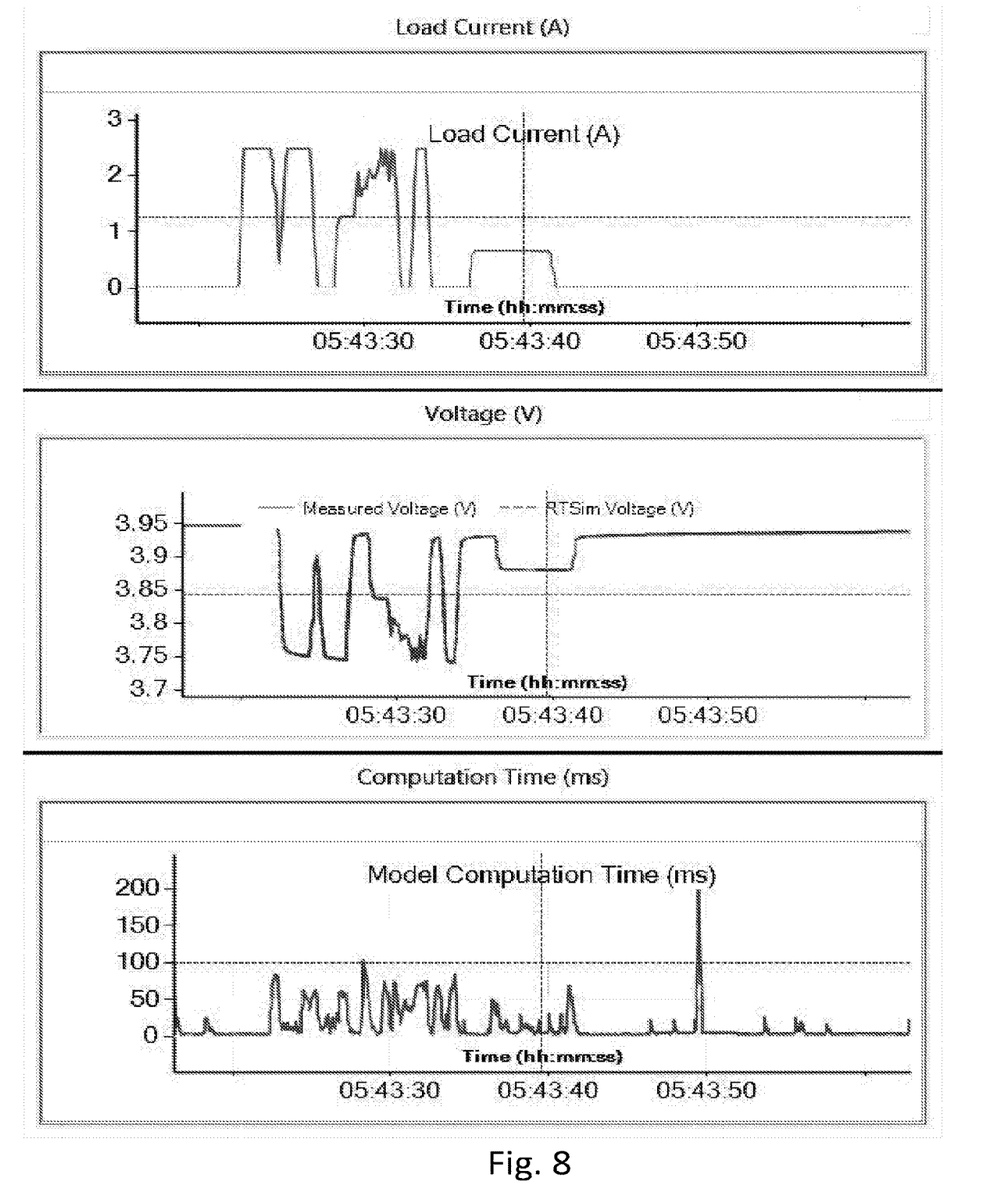
FIG. 8 shows the model/simulator performance in a single cell simulation in real time under random current load.

To evaluate the real-time capabilities and portability of the solver, a single cell simulation on a commercial development board was performed. The board used was the PandaBoard [25] with a Dual-core ARM® Cortex™-A9 MPCore™ at 1 GHz and 1 GB of memory. A physical system was exercised under random current loads. The varying current values were read and presented to the solver along with the environment temperature. The system voltage and temperature predicted by the simulation was then compared to the actual voltage and temperature produced by the system. FIG. 8 shows the model/simulator performance in real time under random load. The average computational time was 12 ms, which is 4.1 times faster than the simulation step used of ~50 ms. The model used includes: 13 dependent variables and 24 scalar parameters.

Disclosed herein is a method for performing numerical model computations within an embedded processor, which involves loading a model numerical solver software program into a memory of the embedded processor and defining a model description which itself includes a list of independent and dependent variables, parameters values and bounds, input sources, and model differential and algebraic equations, then inputting the model description into the model solver, estimating an upper bound on the total memory requirement of the model numerical solver computational tasks for the particular model description, allocating required amounts of memory during instantiation and initialization of the model numerical solver as determined by the estimation of the upper bound on the total memory requirement of the model numerical solver computational tasks for the particular model description prior to commencement of solver steps, receiving at the model solver at least one value for at least one independent variable of the model equations, solving the model equations directly and concurrently with the solver numerical routines and outputting at least one value of one of the dependent variables. With this method, inputting the model description may involve a Functional Mock-up Interface (FMI) description of the model, a C++ source file containing at least the definition of a numerical routine to evaluate the dependent variables of the model as numerical functions for the independent variables, parameters and input sources, or an XML/MathML file describing the model description as a list of independent and dependent variables, parameters values and bounds, input sources and differential and algebraic equations. The model numerical solver software program of the method may include Automatic Differentiation (AD), a complete Differential Algebraic Equation solver, sparse linear algebra techniques, sensitivity analysis, numerical optimization routines, and adaptive step-size. The method may also provide user-controllable solver parameters and optimizer parameters.

Also disclosed herein is a method for controlling a system which involves embedding a processor into an electronic device, loading a model solver software program into a memory of the embedded processor, defining a model description which itself includes a list of independent and dependent variables, parameters values and bounds, input sources, and model differential and algebraic equations, then inputting the model description into the model solver, estimating an upper bound on the total memory requirement for the numerical solver computational tasks for the particular model description, allocating required amounts of memory during instantiation and initialization of the model numerical solver as determined by the estimation of the upper bound on the total memory requirement of the model numerical solver computational tasks for the particular model description and prior to commencement of solver steps, receiving at the model solver at least one value for at least one variable of the model equations, solving the model equations directly and concurrently with the solver numerical routines, outputting at least one value of one dependent variable of the model equations and receiving the at least one value of one dependent variable at a controller, wherein the controller effects changes to the state of the system in response to receiving the at least one value of one dependent variable. With this method, inputting the model description may involve a Functional Mock-up Interface (FMI) description of the model, a C++ source file containing at least the definition of a numerical routine to evaluate the dependent variables of the model as numerical functions for the independent variables, parameters and input sources, or an XML/MathML file describing the model description as a list of independent and dependent variables, parameters values and bounds, input sources and differential and algebraic equations. The model numerical solver software program of the method may include Automatic Differentiation (AD), a complete Differential Algebraic Equation solver, sparse linear algebra techniques, sensitivity analysis, numerical model optimization and adaptive step-size. The method may also provide user-controllable solver parameters and optimizer parameters.

A model numerical solver software program in a memory of an embedded processor as herein disclosed may include a list of independent and dependent variables, parameters values and bounds, input sources, and model differential and algebraic equations, a memory structure wherein the model solver estimates an upper bound on the total memory requirement for the model numerical solver computational tasks for the particular model description and wherein required amounts of memory are allocated during instantiation and initialization of the model simulation as determined by the upper bound estimation on the total memory requirement of the model numerical solver computational tasks for this particular model description and prior to commencement of solver steps, means for receiving at least one input signal from at least one source and computational means for solving at least two equations concurrently. This model solver software program may receive input signals from a Functional Mock-up Interface (FMI) description of the model, a C++ source file containing at least the definition of a numerical routine to evaluate the dependent variables of the model as numerical functions for the independent variables, parameters and input sources, or an XML/MathML file describing the model as a list of independent and dependent variables, parameters values and bounds, input sources and differential and algebraic equations. The model solver program of the method may include an Automatic Differentiation (AD) feature, a complete Differential Algebraic Equation solver, sparse matrix techniques, sensitivities computation, AC small signal analysis and adaptive step-size. The model numerical solver software program may include Automatic Differentiation (AD), a complete Differential Algebraic Equation solver, sparse linear algebra techniques, sensitivity analysis, numerical model optimization and adaptive step-size.

An alert and thoughtful reader will have no difficulty devising myriad variations, improvements and applications of the solver and methods disclosed herein. All such variations, improvements and applications are intended to be encompassed within the claims that follow.

What is claimed is:

1. A method for controlling a motor system by means of model computations within an embedded processor, comprising the steps of:
    defining a model description, the model description comprising:
        a list of independent and dependent variables, parameter values and bounds, input sources, and model equations, at least one of which is differential;
    inputting the model description into a model numerical solver;
    loading the model numerical solver into a memory of the embedded processor;
    estimating an upper bound on the total memory requirement of computational tasks for the model numerical solver for the inputted model description, wherein no dynamic memory allocations beyond the upper-bound of total memory estimate are allowed for runtime computational tasks;
    statically allocating required amounts of memory during instantiation and initialization of a model simulation as determined by the estimation of the upper bound on the total memory requirement of the computational tasks for the model numerical solver for the imputed model description prior to commencement of solver steps;
    by the model numerical solver, directly and concurrently receiving the model equations;
    solving numerically the model equations with the model numerical solver;
    outputting at least one value of the dependent variable of the model equations to a control application;
    receiving the at least one value of one dependent variable at the control application; and
    effecting changes to the state of the motor system by the control application, without making any dynamic memory allocations, in response to receiving the at least one value of one dependent variable, wherein a deterministic response time is guaranteed.

2. The method of claim 1, wherein the inputting the model description step comprises a Functional Mock-up Interface (FMI) description of the model.

3. The method of claim 1, wherein the inputting the model description step comprises a C++ source file containing at least the definition of a numerical routine to evaluate the dependent variables of the model as numerical functions for the independent variables, parameters and input sources.

4. The method of claim 1, wherein the inputting the model description step comprises a XML/MathML file describing the model as a list of independent and dependent variables, parameter values and bounds, input sources, and differential and algebraic equations.

5. The method of claim 1, wherein the model numerical solver comprises numerical routines for an Automatic Differentiation (AD) feature, a complete Differential Algebraic Equation solver, sparse-linear-algebra techniques, sensitivity analysis, numerical model optimization, and adaptive step-size.

6. The method of claim 1, further comprising the step of providing user-controllable solver parameters and optimizer parameters.

7. A method for improving task-execution time in a motor system, comprising the steps of:
    embedding a processor into an electronic device;
    defining a model description, the model description comprising:
        a list of independent and dependent variables, parameter values and bounds, input sources, and model equations, at least one of which is differential;
    inputting the model description into a model numerical solver;
    loading the model numerical solver into a memory of the embedded processor;
    estimating an upper bound on the total memory requirement of computational tasks for the model numerical solver for the inputted model description, wherein no dynamic memory allocations beyond the upper-bound of total memory estimate are allowed for runtime computational tasks;
    statically allocating required amounts of memory during instantiation and initialization of a model simulation as determined by the estimation of the upper bound on the total memory requirement of the computational tasks for the model numerical solver for the imputed model description prior to commencement of solver steps;
    by the model numerical solver, directly and concurrently receiving the model equations;
    solving numerically the model equations with the model numerical solver;
    outputting at least one value of the dependent variable of the model equations to a control application;
    receiving the at least one value of one dependent variable at the control application; and
    effecting changes to the state of the motor system by the control application, without making any dynamic memory allocations, in response to receiving the at least one value of one dependent variable, wherein a deterministic response time is guaranteed.

8. The method of claim 7, wherein the inputting the model description step comprises a Functional Mock-up Interface (FMI) description of the model.

9. The method of claim 7, wherein the inputting the model description step comprises a C++ source file containing at least the definition of a numerical routine to evaluate the dependent variables of the model as numerical functions for the independent variables, parameters and input sources.

10. The method of claim 7, wherein the inputting the model description step comprises a XML/MathML file describing the model as a list of independent and dependent variables, parameter values and bounds, input sources, and differential and algebraic equations.

11. The method of claim 7, wherein the model numerical solver comprises numerical routines for an Automatic Differentiation (AD) feature, a complete Differential Algebraic Equation solver, sparse-linear-algebra techniques, sensitivity analysis, numerical model optimization, and adaptive step-size.

12. The method of claim 7, further comprising the step of providing user-controllable solver parameters and optimizer parameters.

* * * * *